Patented Nov. 11, 1952

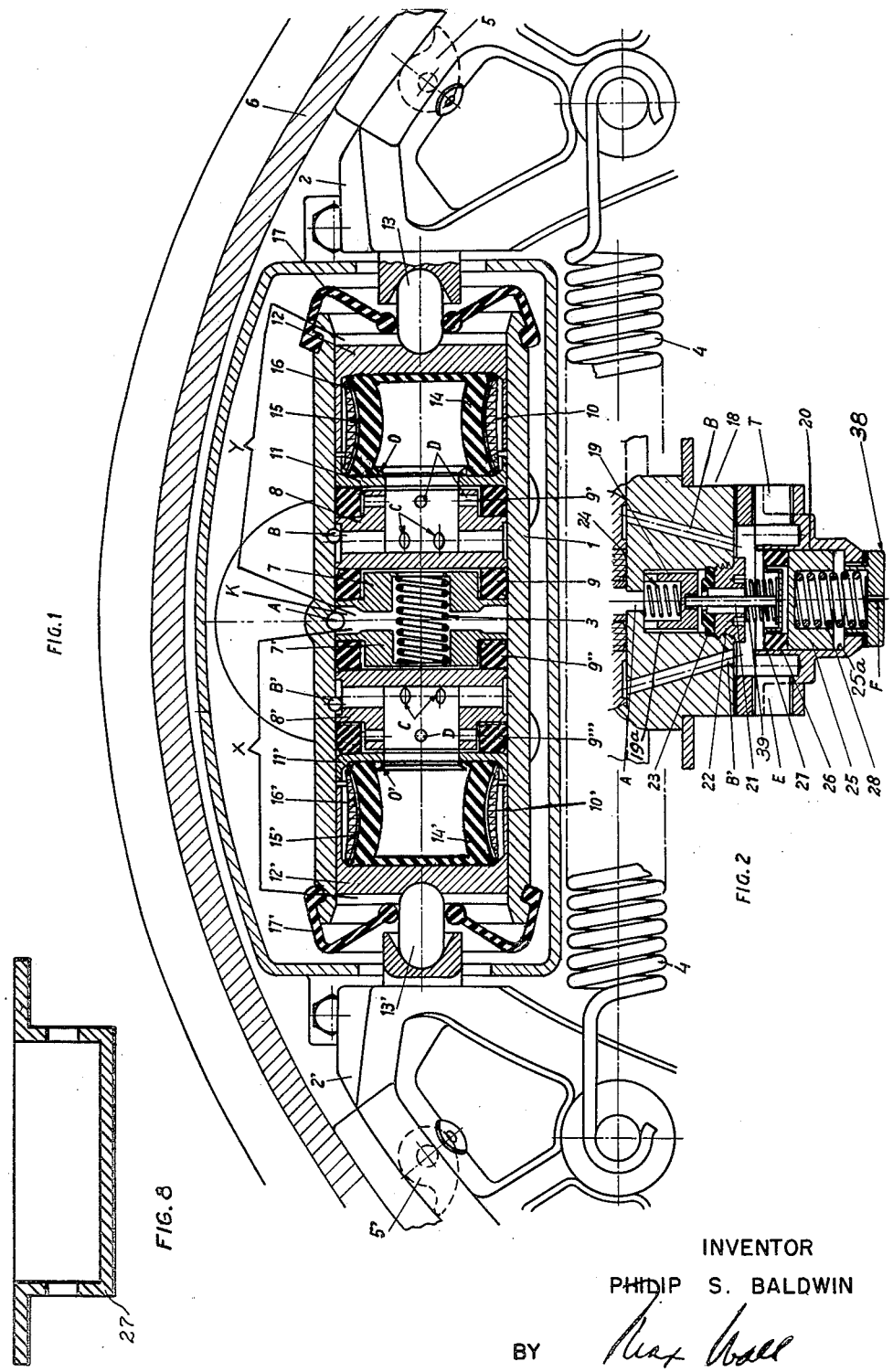

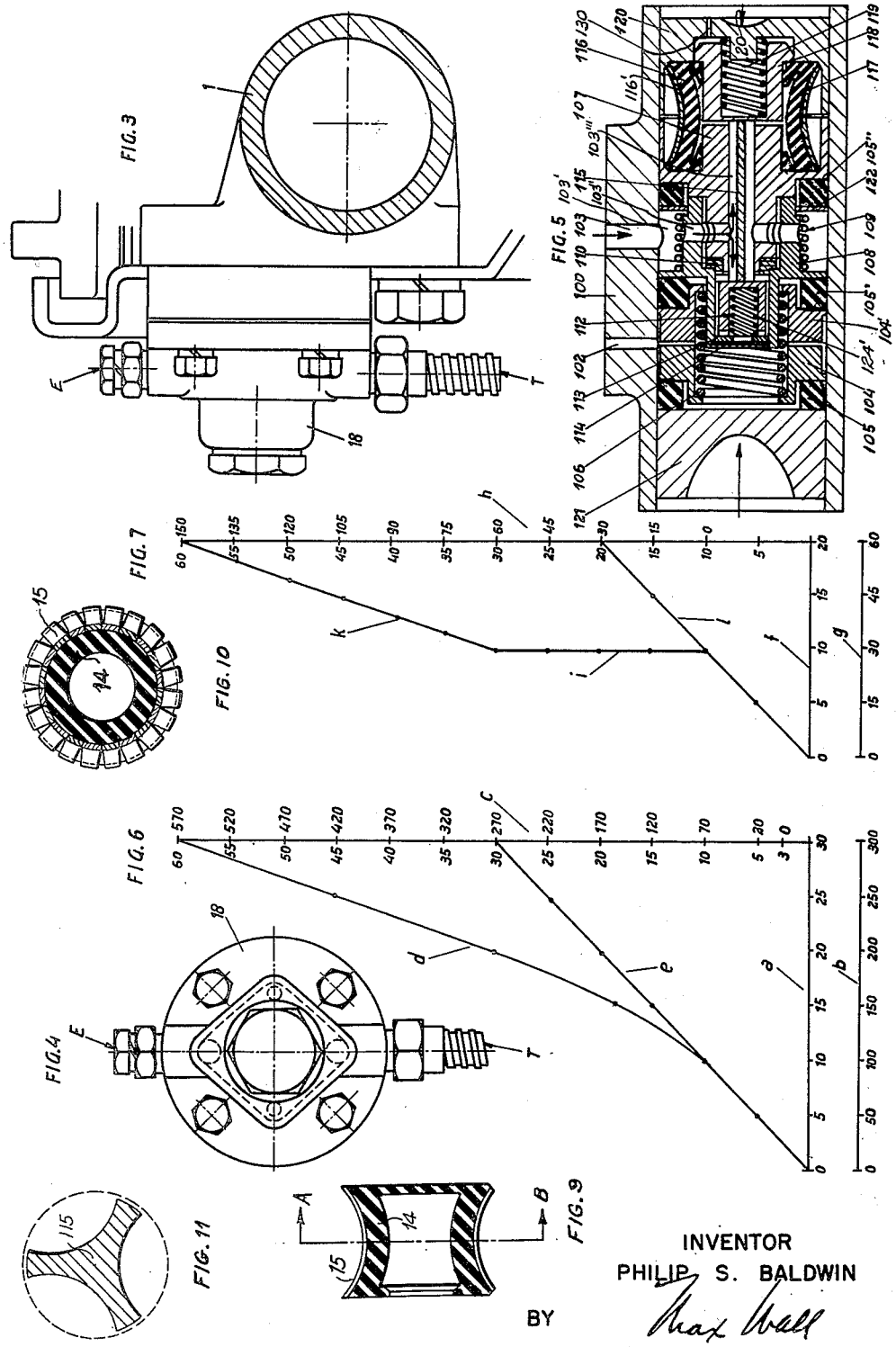

2,617,260

UNITED STATES PATENT OFFICE 2,617,260

PRESSURE AMPLIFYING SYSTEM FOR HYDRAULIC BRAKE WHEEL CYLINDERS

Philip Sidney Baldwin, Florence, Italy

Application July 24, 1947, Serial No. 763,369
In Italy May 1, 1942

Section 1, Public Law 690, August 8, 1946
Patent expires May 1, 1962

9 Claims. (Cl. 60—54.6)

This invention relates to improvements in fluid pressure transmission system, and more particularly to improvements in such systems to permit increasing the working pressure in relation to the unit pressure.

One of the objects of this invention is to provide a fluid pressure transmitting device comprising a compound piston which operates in a motor cylinder in conjunction with a control valve and allows for a gradual and uninterrupted increase in the working pressure in relation to the unit pressure; in other words, for a progressive increase in the working pressure with a relatively low line pressure without any sudden jump between the low and high working pressure.

Another object is to secure an increase in the working pressure without substantially increasing the fluid displacement normally required to secure the working stroke.

A further object is to provide a device of the type indicated which is compact, simple in operation and may be entirely self-contained.

The accomplishment of these and other objects will appear more fully from consideration of the accompanying drawings and specifications as set forth for the purpose of illustrating and describing embodiments thereof, although the invention is not to be construed as limited thereby.

In the drawings:

Fig. 1 shows a longitudinal sectional view of two opposed compound pistons mounted in the wheel cylinder of a hydraulic brake and embodying my invention.

Fig. 2 shows a sectional plan view of the control valve embodying my invention, located externally at the side of the cylinder of Fig. 1, with its base section turned at an angle of 90° to show the inlet and bleeder vents.

Fig. 3 is a side external view of the valve of Fig. 2.

Fig. 4 is an external frontal view of the valve of Fig. 2.

Fig. 5 shows a longitudinal sectional view of a modified form of the device shown in Fig. 1 with the control valve completely enclosed in a brake wheel cylinder.

Fig. 6 is a graph of the working pressure obtainable with the wheel cylinder arrangements shown in Figs. 1 or 5.

Fig. 7 is a graph of the working pressure normally obtained when two pistons with an effective differential in cross section are used to increase the working pressure, when mounted in a wheel cylinder with a control valve. Figure 8 is an enlarged cross sectional detail of the member 27 shown in Figure 2. Figure 9 shows a particular of the compound piston. Figure 10 is a section of Figure 9 taken along the line A—B thereof. Figure 11 is an enlarged cross sectional detail of the push rod 115 of Figure 5.

The compound pistons shown in Figures 1 and 5 are of the type disclosed in my prior Patents Nos. 2,048,771 of July 28, 1936, and 2,219,610 of October 29, 1940, and are provided with an improved element operating on the principle of utilizing the fluid pressure exerted both axially and radially on the improved structure or element; the axial and radial pressures complementing each other.

The device, as shown in Figure 1, comprises two compound pistons X and Y of the type indicated, mounted opposite each other in a hydraulic brake wheel cylinder 1 between the brake shoes 2 and 2', and are yieldably held spaced from each other by the pressure of spacer spring 3 counteracting the pressure of the brake shoe return spring 4.

Two cam adjusting members 5 and 5' of the type commonly used in hydraulic brakes, are mounted against the inner rims of the brake shoes, and serve to adjust the free play between the shoes and the drum 6; they limit the return stroke of the opposed pistons towards the center of the cylinder.

Each of the compound pistons X and Y, as disclosed in Figure 1, is composed, respectively, of the metal parts 7 and 7' and 8 and 8', the elastic freely mounted sealing rings 9 and 9'' and 9' and 9''' and the extensible axial-radial fluid pressure amplifying elements 10 and 10' are enclosed in their metal cup containers 11 and 11' and 12 and 12'.

The various opposed parts of the pistons are freely mounted and yieldably held in place by the counteracting axial pressure of spring 3 within the cylinder and spring 4 outside of the cylinder.

The metal piston parts 7 and 7' are bored axially throughout with an annular reduction in the bore at their outer ends against which abut the corresponding ends of the spacer spring 3. A reduced extension of the parts with smaller external diameter than that of the elastic sealing ring bores and slightly shorter than the axial thickness of the rings, extends into said bores.

The metal parts 8 and 8' have a head and reduced extension with an outer diameter which is smaller than the inner diameter of the rings 9' and 9''' and slightly shorter than the axial thickness thereof, and extend into the respective elastic bores. The heads have a maximum external diameter substantially equal to the internal diameter of the cylinder in which they slide, and an annular channel around their peripheries.

The parts 8 and 8′ are suitably bored axially and radially to establish communication for the hydraulic fluid respectively with the inner chamber of the elastic elements 14 and 14′ and the bores of the sealing rings 9′ and 9′′′ but not with the space of the centre of the cylinder between the opposed pistons. The metal thrust members 13 and 13′ connect the opposed pistons with the brake shoes.

As shown in Fig. 1, the pressure amplifying assemblies 10 and 10′ comprise the expansible elastic elements 14 and 14′ having an inner chamber and an outer concave periphery around which are disposed longitudinally a series of curved leaf springs 15, 15′ (see Figures 9 and 10) with their convex surfaces facing inwards and forming an extensible metal sheath for the elastic elements. The inner periphery of said elastic elements is convex in shape corresponding to the outer concave surface which has a profile corresponding to the convex curvature of the springs 15, 15′ encasing the elements.

The said curved leaf springs are held in place around the periphery of the respective elastic elements by the elastic bands 16 and 16′.

The chambers of the elastic elements 14 and 14′ are closed at one end and open at the other to admit the passage of hydraulic fluid. Around the rims of the elastic chamber openings are fashioned annular lips 0 and 0′ which provide a seal between the elastic elements and the vented metal cups 11 and 11′, the vents of which register with the corresponding openings of the elastic chambers.

It will be appreciated that if fluid were injected under pressure into the elements 14 and 14′, the radial hydraulic pressure would take effect on a series of spring arcs which would tend to be flattened and extended longitudinally to contribute an axial thrust at their two extremities on the corresponding bases of the metal cup containers against which they abut, and these cups would be separated longitudinally one from the other. If, however, the cups were held rigidly together axially they would not separate, and the axial thrust by the springs would then take effect without any longitudinal extension of springs; that is under static conditions, and no fluid displacement would thus be required to secure the said axial thrust because the elastic chambers would be prevented from expanding radially.

As will be shown, it is under these conditions that the radial pressure is utilized in the device under consideration.

It will be apparent that the pressure amplifying assemblies 10 and 10′ and their respective communication vents are not in direct communication with the space K at the centre of the cylinder between the two opposed pistons, said space being fed through the vent A, Fig. 1, whereas the vents B and B′ provide passage for the fluid to the amplifying elements.

The internal periphery of the elastic bands 16 and 16′, as shown in Fig. 1, is convex in shape corresponding to the concave curvature of the springs 15, whereas the external concave profile of these bands is less curved than the internal periphery in order to limit the radial depression outwards of the curved leaf springs under radial hydraulic pressure when, as will be explained hereinafter, the presence of air in the central cylinder space between the opposed pistons makes this possible.

The elastic caps of rubber or similar material 17 and 17′ enclose the ends of the cylinder as illustrated and serve to protect the pistons from dirt and dust.

As shown in Fig. 2, the control valve 18 is located externally at the side of the cylinder. It comprises an upper cup shaped metal piston 19, a lower piston 20 of larger diameter, and the connecting push rod 21 with flanged circular base. A threaded plug 22 with central bore separates the upper cylindrical valve guide 19a from the lower cylindrical valve guide 25a of greater diameter.

An elastic ring, as of rubber 23 seated on the upper annular collar of the threaded plug 22, serves to seat the valve piston 19, this ring having a central opening to permit passage therethrough of push rod 21 and to allow fluid to pass said ring. Longitudinal channels around the outer periphery of piston 19 and cross channels cut in the upper rim of same serve to ensure a free passage for the hydraulic fluid through the vent A into the cylinder between the two opposed pistons.

In the upper valve piston 19 is lodged the spiral reaction spring 24.

The valve piston 20 is composed of a piston cup 25 with a central socket in its lower face to accommodate the spring 28, an elastic sealing ring 26 and a metal thrust plate with bowl section 27 extending into the elastic ring bore. The ring 26 is freely mounted and yieldably supported between the head and thrust plate, and held in place by the counteracting axial pressure of springs 28, 24 and spring 39. The spring 28 bears against the head of piston head 25 and the base of the valve which has a breather vent F through its outer face 38. The thrust plate 27 is bored radially to provide passages through its bowl section to establish communication for the hydraulic fluid with the inner radial face of the sealing ring 26.

The push rod 21 is freely mounted between the two valve pistons, the flanged end resting against the bottom of the thrust plate bowl 27 and the other end in a socket cut in the lower face of the piston 19. The rod 21 is yieldably supported under counteracting axial pressure of springs 28 and 24.

The three springs 39, 24 and 28 are mounted in the valve under initial compression, and the spring 28 is considerably stiffer than spring 24 so that normally in released position, the spring 24 is compressed and piston 19 is held raised from its seat 23 by the push rod 21.

To facilitate bleeding air from the system there is provided a bleeder vent E closing plug in the upper wall of the valve body as shown in Figs. 3 and 4.

As already stated, the elastic bands 16 and 16′ around the amplifying elements 10 and 10′ also serve to limit the radial depression of the curved leaf springs 15, 15′ during the bleeding operation. In fact if air is trapped in the cylinder between the two opposed pistons it would be compressed and permit the springs to extend axially towards the centre under hydraulic pressure to a point where they might become permanently deformed.

In operation, fluid under pressure from the master pump (not shown) enters the control valve through port T (Figs. 1, 2, 3 and 4) and flows through ports BB' into the elastic chambers of elements 14, 14'. Fluid flows also into the space K between the two opposed pistons, passing around stem 21, through the central bore of the sealing element 23, said bore having a greater diameter than stem 21, and the fluid flows through the longitudinal channels cut in element 19 and into port A. Under the action of fluid entering through port A in the space K between the opposed pistons, the latter now move outwardly from the center as a unit against the tension of the brake shoe return spring 4 to bring the brake shoes into contact with the drum.

At a given hydraulic pressure, even before the opposed pistons begin to move against the resistance of spring 4, piston valve 20 is forced down by hydraulic pressure which compresses spring 28 and piston 19 is depressed through the action of spring 24, moving down on its seat 23 to close the return flow of the fluid from the cylinder 1 between the opposed piston bases but permitting the fluid to flow freely into the cylinder through vent A because the fluid from T under pressure raises valve piston 19 from its seat 23, overcoming the light pressure of spring 24. In other words, line pressure is sufficient to overcome the resistance of spring 24. On the other hand, passages B and B' remain always open for the fluid to flow to and from the elastic elements 14 and 14'. Then the space K between opposed pistons becomes filled with fluid.

When under the action of fluid under pressure filling the space K between opposed pistons, the brake shoes are forced into solid contact with the drum, no more fluid can enter the cylinder through vent A. Under the pressure of the reaction spring 24, the valve piston 19 is then seated on the sealing element 23. At this moment the fluid pressure acting on the curved leaf springs 15, 15' of the pressure amplifying elements 10 and 10' provides a force having a component supplementing the resultant of the pressure exerted on the inner face of the piston perpendicular to the axis of the cylinder. On further rise of the hydraulic pressure, said component increases progressively and uninterruptedly, thereby increasing progressively and uninterruptedly the pressure on the brake shoes.

The liquid trapped in the cylinder in the space between the opposed pistons now serves as an unyieldable base for the inward axial thrust by springs 15, 15' which therefore cannot extend axially under radial pressure towards the centre of the cylinder, nor can they extend outwardly against the rigid resistance of the brake drums so that the said axial thrust by the springs is transmitted under static conditions without any appreciable longitudinal extension of the springs. Under these circumstances the elastic chambers of elements 14 and 14' cannot expand and practically no more fluid displacement is required to secure the increased working pressure than is normally needed when conventional opposed pistons of equal cross section are used.

Upon release of the line pressure, valve piston 20 moves up under pressure of spring 28 against the counteracting pressure of spring 24 and the slight residual hydraulic pressure of the fluid trapped in the cylinder space between the opposed pistons under the tension of the brake shoe return spring bearing axially on the opposed pistons; the valve piston 19 is unseated, the fluid in the cylinder between the opposed pistons is released, and the pistons are moved back by the return spring to their initial position. When line pressure from T is released, piston 25 is relieved of that pressure and spring 28 is free to push piston 25 upwards against the stem 21 which raises piston 19 from its seat against the light reaction spring 24 and fluid between the opposed wheel cylinder pistons is free to discharge through A into T.

In view of the fact that the hydraulic pressure in the cylinder is exerted simultaneously and uninterruptedly on the end faces of the opposed compound pistons and within the expansible chambers thereof, the curved leaf springs 15, 15' do not extend axially under radial hydraulic pressure during the forward movement of the pistons against the tension of the brake shoe return spring to take up the slack and compensate for the brake shoe wear. When, however, the brake shoes come into solid contact with the drum and the radial hydraulic pressure on the springs 15 and 15' increases, these as already explained can no longer extend axially to any appreciable extent against the trapped liquid at the base of the pistons at one end and the drum at the other end, so they act to force the shoes against the drum.

Obviously, the potential axial thrust by the curved leaf springs 15, 15' under radial hydraulic pressure will vary with the length of the chord and the height of the chamber of the springs so that it will always be possible to vary the pressure output obtainable with any given compound piston of the type described by modifying the characteristics of the springs.

By thus utilizing in a given motor cylinder the radial hydraulic pressure which is normally lost for useful work, it is possible to have an increase in the working pressure of even three or four times without proportionately increasing the unit pressure; in other words, to obtain a high working pressure with low line pressure with all the advantages incident thereto.

As already indicated, the increase in the working pressure through utilizing the radial hydraulic pressure takes place smoothly and progressively without any sudden jump from the low to the high pressure. This would not ordinarily be the case for example, were two pistons with a differential in effective cross section disposed in a motor cylinder with a control valve to secure an increase in the working pressure.

The graphs in Figs. 6 and 7, as already indicated show respectively the different working pressure obtainable with the axial-radial amplifying device described and that normally secured with pistons having different effective cross sections mounted in a motor cylinder.

On the graph of Fig. 6, $a$ indicates the unit hydraulic pressuer in kg./cm.$^2$; $b$ indicates the equivalent mechanical pressure on the prime mover piston in kg.; $c$ indicates the working pressure on the brake shoes in kg. when the tensional resistance of the brake shoe return spring is 30 kg.; $d$ the pressure output by the compound pistons in which the radial hydraulic pressure is utilized to produce an increase in the working pressure of 3 to 1; and $e$ indicates the pressure output obtainable with the pistons of like cross section.

On the graph of Fig. 7, $f$ indicates the hydraulic unit pressure in kg./cm.$^2$; $g$ the equivalent mechanical pressure on the prime mover piston in kg.; $h$ indicates the working pressure on the brake shoes in kg. when the tensional resistance of the brake shoes return spring is 30 kg.; *i* indicates the rise in working pressure when the high pressure piston comes into play; *k* indicates the working pressure output of the high pressure piston with a ratio of 3 to 1, and *l* indicates the pressure output obtainable with normal pistons with ratio 1 to 1.

Let us suppose as shown in Fig. 6 that the cross section of the prime mover piston is equal to that of the opposed compound pistons in the motor cylinder of Fig. 1, and that the cross section is 10 cm.$^2$. Then for every increase of 5 kg./cm.$^2$ in the unit pressure there would be required 50 kg. axial mechanical pressure on the prime mover piston. If the ratio in the pressure increase through utilizing the radial hydraulic pressure in the compound pistons is 3 to 1 starting at about 10 kg./cm.$^2$ unit pressure and the brake shoe return spring tension is 30 kg., then at 10 kg./cm.$^2$ unit pressure there would be 70 kg. working pressure (100 kg.—30 kg.=70 kg.) and at 30 kg./cm.$^2$ unit pressure without utilizing the radial hydraulic pressure, that is with normal opposed pistons with equal cross section, the working pressure would be 270 kg.

(300 kg.—30 kg.=270 kg.)

whereas with the compound pistons of Fig. 1 at 30 kg./cm.$^2$ unit pressure one would have 670 kg. (70+600 kg.=670 kg.) or an actual increase of about 2.4 times.

As indicated on Fig. 7 the pressure increase obtainable with pistons of different effective cross sections mounted in a motor cylinder with valve control is very different. Let us suppose, in fact, that the cross section of the prime mover piston is 3 cm.$^2$, the effective cross section of the low pressure piston in the motor cylinder is 3 cm.$^2$ and that of the high pressure piston in the motor cylinder is 9 cm.$^2$. Then the ratio between the prime mover piston and the low pressure motor cylinder piston is 1 to 1, and the ratio between the prime mover piston and the high pressure motor cylinder piston is 3 to 1. If the tensional resistance of the brake shoe return spring is 30 kg., there will be required 30 kg. mechanical pressure on the prime mover, that is 10 kg./cm.$^2$ unit pressure to bring the brake shoes into contact with the drum. If the motor cylinder high pressure piston now comes into play, initially with 30 kg. mechanical pressure on the prime mover there will be no working pressure on the brake shoes, but as the high pressure piston comes into play, the 30 kg. mechanical pressure on the prime mover suddenly becomes 60 kg. working pressure on the brake shoes (90 kg.—30 kg.=60 kg.). In other words there will be a sudden jump in the initial working pressure from 0 to 60 kg. which is not admissible in a brake because said pressure should be applied gradually and progressively.

Fig. 5 shows a longitudinal cross section of a single compound piston of the type disclosed in Fig. 1 mounted in the brake wheel cylinder 100 opposed to a normal piston. It is controlled by a double acting valve incorporated in the compound piston and entirely enclosed in the cylinder. The over-all dimensions of the cylinder are approximately those normally ued in a wheel cylinder for hydraulic brakes.

The normal piston comprises the metal parts 104 and 121 between which is freely mounted and yieldably supported the elastic sealing ring 105. The compound piston comprises the metal base part 104' and the central metal parts 108 and 107 which are suitably united to form a single fluid distributor unit, and the pressure amplifying extensible element 116 with its sheaf of curved leaf springs 117 disposed longitudinally about its outer periphery and contained in the two opposed metal cups formed by the parts 107 and 120 which are slidably mounted in the cylinder 100. The elastic sealing rings 105' and 105'' are freely mounted and yieldably supported respectively between the part 104' and the flanged base of the part 108, and between the metal thrust ring 122 and the radial flange of part 107 at the base of the extensible element 116.

The ends parts 120 and 121 of the opposed pistons are connected with the brake shoes, not shown by the metal thrust members, not shown. The central distributor unit 108—107 is surrounded by an annular chamber 103' to establish communication in the cylinder with the fluid inlet port 103. The said annular chamber through radial passages 103'' communicates with the axial bore 103''' in which is slidably mounted the valve push rod 115 with longitudinal channels to permit the passage of fluid to the valve pistons 124' and 118.

The part 108 of the distributor unit engages at its inner end an elastic sealing ring 110 the outer face of which extends towards the valve piston 124' which is slidably mounted in a cylindrical guide formed by the inner extremity of the distributor unit part 108. The valve piston 124' is urged towards the sealing ring 110 by spring 112. The head of said valve piston 124' has a longitudinally grooved external diameter and radial bores as shown to establish a passage for the fluid when the piston 124' is not seated on the ring 110. The fluid which flows through the passages thus formed penetrates to the cavity of piston valve 124' in which is lodged the reaction spring 112, and thence through the bore 114 of the metal stop washer 113 into the space between the opposed piston parts 104 and 104'. The stop washer 113 is held in place by a split ring lodged in an annular slot at the outer extremity of the valve piston guide bore.

The valve piston 118 of larger diameter than that of piston 124' is under axial pressure of the reaction spring 119 which is considerably stiffer than the spring 112 of valve piston 124' so that normally valve piston 124' is held open.

The spring 109 bearing against the flange of part 108 at one end and the metal thrust ring 122 at the other end holds the elastic sealing ring 105'' under axial compression sufficient to expand it radially against the cylinder wall and ensure an efficient seal against loss of fluid or influx of air.

The spring 106 on the other hand, axially compressed by the opposing tension of the brake shoe return spring, 4 (not shown in Figure 5) bears against the metal parts 104 and 104' of the opposed pistons and serves to compress axially the elastic sealing rings 105 and 105' and to expand them radially to ensure an efficient seal between the opposed pistons. The parts 104 and 104' are yieldably held in spaced relation to each other by spring 106, the return stroke of the opposed pistons towards the centre of the cylinder being limited by cam adjuster members (not shown) mounted against the inner rims of the brake shoes as already shown on Fig. 1.

Valve piston 118 is cup shaped with an annular head which initially partially penetrates into the socket cut in the inner face of part 120, and has a reduced extension at its base which fits into a socket cut in the face of the reduced extension of part 107 extending into the concave elastic chamber of element 116. The valve piston is guided at its two extremities by the sockets in which the annular head and reduced extension slide.

Annular sealing lips 116' of the elastic element 116 engage respectively the interior annular boss of part 107 and the valve piston 118 as shown and provide a seal between the elastic chamber and these parts. A breather vent 130 through the head of part 120 establishes communication between the valve cavity and the outside atmosphere. The vent 102 in the wall of the cylinder which is normally closed by a plug (not shown) serves to bleed the air from the system initially.

In operation, fluid under pressure from the master pump (not shown) penetrates into cylinder 100 through port 103 into the external annular chamber 103' of parts 108—107 and flows through the radial and axial passages of these parts into the space at the centre of the cylinder between the parts 104 and 104', and also flows into the element 116, the valve piston 124' being initially held open by the pressure of spring 119 bearing on the push rod 115.

The opposed pistons are forced out against the tension of the brake shoe return spring to bring the brake shoes into contact with the drum. Almost immediately as the opposed pistons begin to move under hydraulic pressure, even before the brake shoes contact the drum, the hydraulic pressure on the valve piston 118 compresses the reaction spring 119 and the valve piston moves out against the socket base of part 120. The valve piston 124' under action of spring 112 is moved in against the elastic ring 110 to shut off the return flow of the fluid in the space between the opposed pistons but always permitting the flow of the fluid to the said space because the line pressure at that time is greater than the resistance offered by spring 112.

When the brake shoes come into solid contact with the drum, no more fluid can enter the space between the opposed pistons past the valve and the liquid in this space is thus in closed circuit.

As the hydraulic pressure increases, the radial pressure in the elastic chamber of element 116 takes effect on the curved leaf springs 117 as already described, to increase the working pressure against the brake shoes without appreciably contributing to the axial extension of these springs, and the radial expansion of the elastic chamber.

When the line pressure is released, valve piston 118 moves back under pressure of spring 119, and the valve piston 124' is unseated from the elastic ring 110 by the push rod 115, against the light countering pressure of spring 112 and the slight residual pressure of the fluid trapped in the space between the opposed pistons by the tension of the brake shoe return spring bearing axially on the opposed piston heads, the trapped fluid between the opposed pistons is released, and the pistons are returned to their initial position thereby liberating the brake shoes from the drum.

What I claim is:

1. A fluid pressure actuated motor comprising a motor cylinder having a pressure chamber connected to a source of fluid under pressure, a piston movable on each side of said pressure chamber, axially thereof to actuate a pressure transmission means, said pistons being simultaneously movable with respect to said cylinder and individually movable with respect to each other under the force of the fluid under pressure, at least one of said pistons having a second pressure chamber, a passage in said motor connecting said second chamber communicating continually with said pressure source, valve means in said motor for controlling the flow of fluid under pressure to said first chamber, said valve being responsive to the fluid pressure from said source to isolate only said first pressure chamber against return flow therefrom while simultaneously permitting fluid under pressure to continue to flow to said second pressure chamber, said flow effecting an initial axial movement of said pistons on each side of said first chamber, the flow of fluid to said second chamber continuing uninterrupted before, during and after the closing of said valve, and an expansible body forming said second chamber, responsive to said continued flow, for effecting an axial thrust of said chambered piston.

2. A device as claimed in claim 1 in which the valve means forms part of said chambered piston.

3. A device as claimed in claim 1, in which said pistons have equal effective areas exposed to the pressure of fluid in said first chamber.

4. A fluid pressure actuated motor comprising a motor cylinder having a first pressure chamber connected to a source of fluid under pressure, a piston movable on each side of said pressure chamber axially thereof to actuate a pressure transmission means, each piston being simultaneously movable with respect to said cylinder, one of said pistons having an expansible body having a second pressure chamber therein in continuous communication with said pressure source, passages in said piston communicating with said pressure source, a valve within the passage of said latter piston for controlling the flow of fluid under pressure to said first chamber, said valve being initially open to allow fluid to flow to the first chamber between the pistons to move them in opposite directions, said valve thereafter closing in response to rise in pressure in said first chamber to shut off return flow from said first chamber but permitting fluid to continue to flow into said second chamber, the flow of fluid to said expansible piston body continuing during such isolation, said expansible body responding to said continued flow to effect an axial thrust thereof.

5. A device as claimed in claim 4, said valve including means within the chambered piston for opening the valve upon release of pressure from said source.

6. A fluid pressure actuated motor comprising a motor cylinder, a pair of oppositely working piston means having head portions in said cylinder, each piston being movable axially thereof in opposite directions to actuate a pressure transmission means, a pressure chamber within said cylinder intermediate said piston means, said piston means having equal effective areas exposed to said intermediate chamber, a valve in said motor between said pressure source and said pressure chamber, said valve controlling the flow of fluid under pressure to said intermediate pressure chamber, each of said piston means including expansible elements forming an individual expansible pressure chamber independent of said intermediate chamber, said elements being movable with the respective piston means in response to the flow of fluid under pressure to said intermediate chamber, said intermediate and individual chambers being initially and simultaneously communicable with a common source of fluid under pressure, and means responsive to pressure (from said pressure source) for closing said valve to isolate said intermediate chamber against return flow therefrom, said last means being yieldably supported and permitting fluid to flow from said fluid pressure source until an initial increase of pressure has been built up in said intermediate chamber, said pistons being moved apart by said initial increase, thereby increasing the effective area of said intermediate chamber, said individual chambers being continually open to said fluid pressure source during said initial movement and thereafter, said piston heads being subsequently subjected to an axial thrust by continued pressure in said expansible pressure chambers after the valve has closed off communication with said intermediate chamber.

7. A fluid pressure actuated motor having an inlet for the entry of fluid under pressure and a valve for controlling the flow of fluid under pressure therein, said motor comprising a cylinder with pistons slidable therein in opposite directions, a pressure chamber in said cylinder between said pistons, fluid passages in one of said pistons communicating with said inlet and leading to said pressure chamber, said valve lying within said last named piston and comprising spaced heads and a spacing means between them, one of said heads acting as the valve and being yieldingly retained in open position with respect to one of said passages to allow fluid under pressure to flow from said inlet to said pressure chamber, said valve head having a lesser cross sectional area than the other head, said greater head being movable axially against said yielding means in response to the pressure of the fluid introduced into the cylinder, yieldable means moving said valve axially in the same direction to close said passage against return flow from said pressure chamber, but permitting said valve to open under pressure from the inlet to allow fluid to flow to said chamber.

8. A fluid pressure actuated motor according to claim 7, in which an expansible member is chambered within said valved piston, said expansible member being expansible radially and exerting a thrust axially under the pressure of fluid therein when the valve is closed.

9. A fluid pressure actuated motor comprising a motor cylinder having a pressure chamber connected to a source of fluid under pressure, a compound piston movable axially in said cylinder with respect to said pressure chamber, said piston comprising an expansible body forming a second chamber which communicates continually with said pressure source, passages in said cylinder and piston for guiding fluid under pressure to said chambers, a valve in said piston controlling said passages, said valve being yieldingly supported at opposite ends thereof within said piston, and being movable axially, said valve initially being held open by one of said yielding means to allow fluid under pressure to flow to both chambers, said last named yielding means responding to continued application of fluid pressure to close said valve, thereby closing the passage to said first chamber to prevent return flow, the passage to the second chamber remaining open, the flow of fluid to said second chamber continuing uninterruptedly before, during and after the closing of said valve, said continued flow expanding said body after the closing of the valve to cause an axial thrust of said body, the valve being opened upon release of pressure, whereupon the fluid in both chambers may return to its source.

PHILIP SIDNEY BALDWIN.

REFERENCES CITED

The following references are of record in the file of this patent:

UNITED STATES PATENTS

| Number | Name | Date |
| --- | --- | --- |
| 2,048,771 | Baldwin | July 28, 1936 |
| 2,213,948 | Bowen | Sept. 10, 1940 |
| 2,227,245 | Carroll | Dec. 31, 1940 |
| 2,282,556 | Bowen | May 12, 1942 |
| 2,442,057 | Page | May 25, 1948 |
| 2,513,015 | Fike | June 27, 1950 |